US008731811B2

(12) United States Patent
Bilek et al.

(10) Patent No.: US 8,731,811 B2
(45) Date of Patent: May 20, 2014

(54) METHODS AND SYSTEMS FOR DISPLAYING A TAXI CLEARANCE

(75) Inventors: Jan Bilek, Cerveny Kostelec (CZ); Ondrej Pokorny, Blizkov (CZ); Tomas Marczi, Beroun (CZ)

(73) Assignee: Honeywell International Inc., Morristown, NJ (US)

( * ) Notice: Subject to any disclaimer, the term of this patent is extended or adjusted under 35 U.S.C. 154(b) by 124 days.

(21) Appl. No.: 13/277,682

(22) Filed: Oct. 20, 2011

(65) Prior Publication Data

US 2013/0103297 A1 Apr. 25, 2013

(51) Int. Cl.
*G08G 5/06* (2006.01)
*G01C 21/00* (2006.01)

(52) U.S. Cl.
USPC ............................ 701/120; 701/528; 701/532

(58) Field of Classification Search
USPC .......................... 701/120, 528, 532, 537, 538
See application file for complete search history.

(56) References Cited

U.S. PATENT DOCUMENTS 5,844,503 A 12/1998 Riley et al.
6,085,147 A * 7/2000 Myers ........................... 701/528
6,144,915 A * 11/2000 Shiomi et al. ................. 701/120
6,477,515 B1 * 11/2002 Boroujerdi et al. ............. 706/14
6,751,545 B2 6/2004 Walter
6,862,519 B2 3/2005 Walter
7,222,017 B2 5/2007 Clark et al.
7,343,229 B1 3/2008 Wilson
7,630,829 B2 12/2009 Pepitone
7,755,516 B2 7/2010 Clark et al.
7,813,845 B2 10/2010 Doose et al.
7,999,699 B2 8/2011 Caillaud et al.
2003/0105579 A1 6/2003 Walter
2004/0006412 A1 1/2004 Doose et al.
2005/0283305 A1 * 12/2005 Clark et al. .................. 701/120
2006/0224423 A1 * 10/2006 Sun et al. .......................... 705/7
2007/0241935 A1 10/2007 Pepitone et al.
2009/0051570 A1 2/2009 Clark et al.
2009/0265089 A1 10/2009 Gauffriau et al.

(Continued)

FOREIGN PATENT DOCUMENTS

EP 2355070 A2 8/2011

OTHER PUBLICATIONS

J. Y. Yen., Finding the K Shortest Loopless Paths in a Network, Management Science, vol. 17, No. 11, Theory Series (Jul. 1971), pp. 712-716.*

(Continued)

*Primary Examiner* — Fadey Jabr
*Assistant Examiner* — Courtney Heinle
(74) *Attorney, Agent, or Firm* — Ingrassia Fisher & Lorenz, P.C.

(57) ABSTRACT

Methods and systems are provided for completing and displaying a taxi clearance for an aircraft at an airport. One exemplary method involves receiving an input taxi clearance including a first taxi path of a plurality of taxi paths at the airport and a second taxi path of the plurality of taxi paths that succeeds the first taxi path in the input taxi clearance, and determining a plurality of possible taxi routes between the first taxi path and the second taxi path. The method continues by identifying an optimal taxi route from among the plurality of possible taxi routes, and graphically indicating that the taxi clearance for the aircraft includes the optimal taxi route between the first taxi path and the second taxi path.

19 Claims, 6 Drawing Sheets

(56) References Cited

U.S. PATENT DOCUMENTS

| | | | | |
|---|---|---|---|---|
| 2009/0306887 | A1* | 12/2009 | Clark et al. | 701/202 |
| 2010/0017105 | A1 | 1/2010 | Pepitone | |
| 2010/0036606 | A1* | 2/2010 | Jones | 701/202 |
| 2010/0125403 | A1 | 5/2010 | Clark et al. | |
| 2010/0198489 | A1 | 8/2010 | Rozovski et al. | |
| 2010/0280748 | A1* | 11/2010 | Mundinger et al. | 701/200 |
| 2010/0324807 | A1 | 12/2010 | Doose et al. | |
| 2011/0184635 | A1 | 7/2011 | Khatwa et al. | |
| 2011/0196599 | A1 | 8/2011 | Feyereisen et al. | |
| 2011/0282565 | A1* | 11/2011 | Law et al. | 701/117 |
| 2012/0316766 | A1* | 12/2012 | Lafon et al. | 701/120 |
| 2013/0046465 | A1* | 2/2013 | Serbanescu et al. | 701/527 |

OTHER PUBLICATIONS

EP Office Action for Application No. 12 188 214.6 dated May 29, 2013.

Zhen, L. et al.: "A Dynamic Model for Aircraft Route Optimizing in Airport Surface Management", 9th International Conference on Electronic Measurement & Instruments (ICEMI) Aug. 16-19, 2009, Beijing, China; Published: IEEE, Piscataway, NJ, Aug. 16, 2009, pp. 3-1068-3-1072, XP031537387, ISBN: 978-1-4244-3863-1.

Pschierer, C. et al.: "Standardization of Databases for AMDB Taxi Routing Functions", Proceedings of the SPIE, vol. 7689, Jan. 1, 2010, XP040535793, DOI: 11117/12.850112.

EP Search Report for Application No. 12 188 214.6 dated May 16, 2013.

* cited by examiner

METHODS AND SYSTEMS FOR DISPLAYING A TAXI CLEARANCE

TECHNICAL FIELD

The subject matter described herein relates generally to avionics systems, and more particularly, embodiments of the subject matter relate to automatically completing discontinuities in input taxi clearances.

BACKGROUND

Taxi instructions, also referred to as a taxi clearance, provide a specific route (i.e., a sequence of taxiways, runways, or segments thereof) which an aircraft (or another vehicle) should follow when traversing between locations on the ground (e.g., between terminals, hangars and/or runways) to avoid confusion and/or runway incursions or to otherwise maintain safe and organized ground traffic flow. Taxi instructions are typically received by a pilot from an air-traffic controller immediately prior to taxiing the aircraft, for example, from a terminal and/or hangar to a runway for departure, from a runway to a terminal and/or hangar after landing, or to otherwise taxi the aircraft clear of a runway.

In some situations, an air traffic controller may only provide portions of the taxi clearance, requiring the pilot to manually determine the best way to navigate between successive taxiways of the taxi clearance that do not intersect. Not only does this present an obstacle to graphically presenting the taxi clearance to the pilot and/or co-pilot, but requiring the pilot to manually complete any discontinuities in the taxi clearance further increases the workload on the pilot. Additionally, in other situations, due to various factors, the taxi clearance may include unavailable taxiways (e.g., taxiways that are not operational due to temporary construction or other restrictions), non-existent taxiways, or otherwise improper taxiways, which may require additional action on behalf to the pilot and/or co-pilot to successfully taxi the aircraft. Accordingly, it is desirable to automatically resolve any issues relating to the taxi clearance in a manner that does not increase the workload on the pilot or otherwise degrade situational awareness.

BRIEF SUMMARY

A method is provided for displaying a taxi clearance for an aircraft. The method involves receiving an input taxi clearance including a first taxi path of a plurality of taxi paths at the airport and a second taxi path of the plurality of taxi paths, the second taxi path succeeding the first taxi path, and determining a plurality of possible taxi routes between the first taxi path and the second taxi path. The method continues by identifying an optimal taxi route from among the plurality of possible taxi routes, and graphically indicating that the taxi clearance for the aircraft includes the optimal taxi route between the first taxi path and the second taxi path.

In another embodiment, a system suitable for use with an aircraft is provided. The system includes a display device, a data storage element configured to maintain information pertaining to a plurality of taxi paths, and a processing system coupled to the display device and the data storage element. The processing system is configured to receive an input taxi clearance including a first taxi path of the plurality of taxi paths and a second taxi path of the plurality of taxi paths, determine a plurality of possible taxi routes between the first taxi path and the second taxi path based on the information pertaining to the plurality of taxi paths maintained by the data storage element, identify an optimal taxi route from among the plurality of possible taxi routes based on the information maintained by the data storage element, and graphically indicate the optimal taxi route on the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to systems and methods for automatically (i.e., without manual and/or human interaction) completing or otherwise correcting discontinuities in an input taxi clearance for an aircraft and displaying the completed taxi clearance on a display device associated with the aircraft. As described in greater detail below, when a discontinuity exists between two successive taxi paths of the input taxi clearance, a plurality of possible taxi routes between the two taxi paths is determined and an optimal taxi route between the two taxi paths is automatically identified from among the plurality of possible taxi routes based on a variety of different criteria, such as, for example, the current location and/or heading of the aircraft, the preceding and/or succeeding taxi paths of the input taxi clearance, the lengths of the possible taxi routes, the types of taxi paths that make up the possible taxi routes, the number of runway crossings for the possible taxi routes, the relative complexities of the possible taxi routes, and the like. The optimal taxi route is inserted between the two taxi paths of the input taxi clearance and displayed or otherwise graphically indicated on the display device onboard the aircraft. In this manner, the pilot's and/or co-pilot's workload may be reduced and/or the pilot's and/or co-pilot's situational awareness may be increased.

Figure 1:
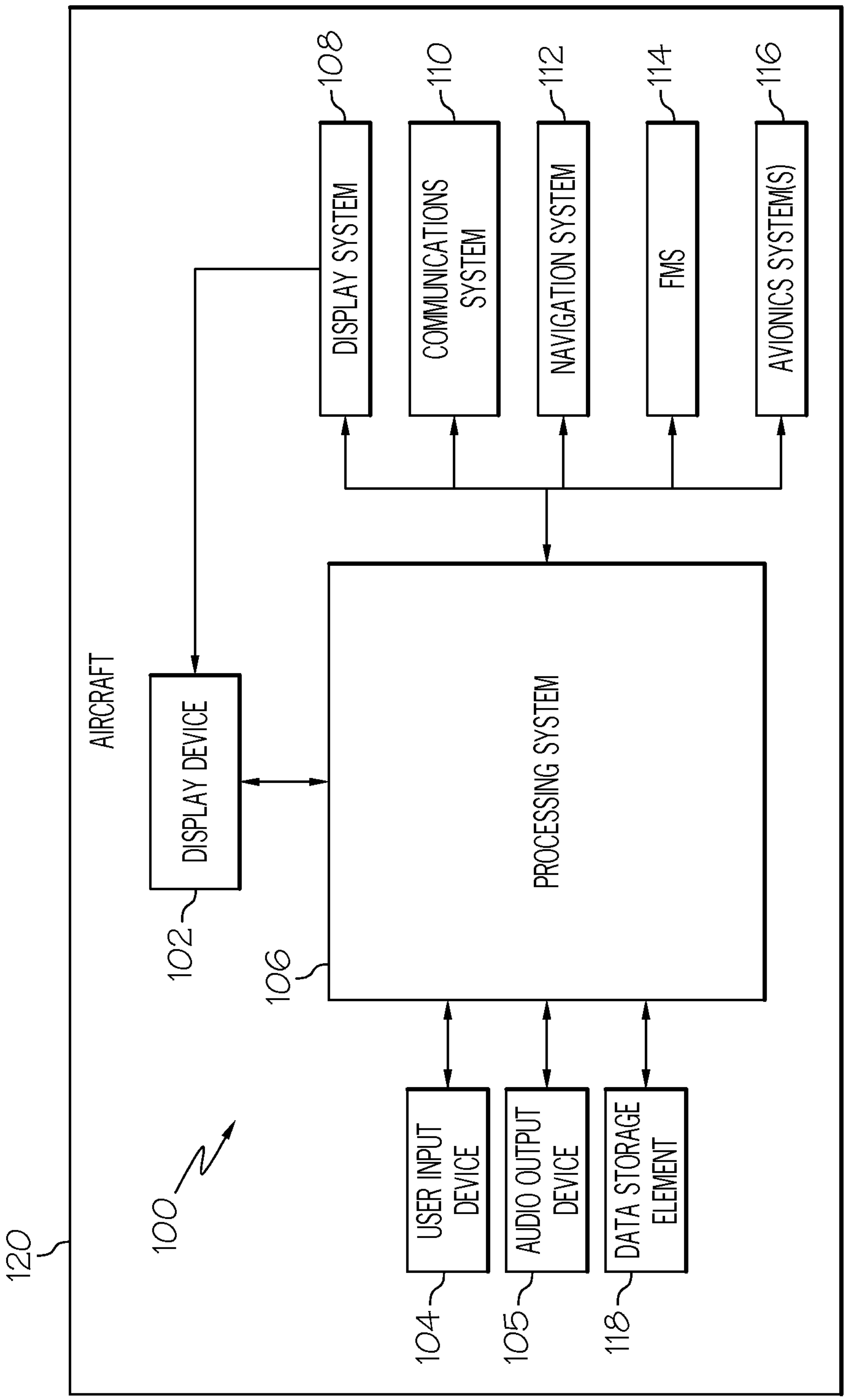
FIG. 1 is a block diagram of a system suitable for use with an aircraft in an exemplary embodiment.

FIG. 1 depicts an exemplary embodiment of a system 100 which may be utilized with a vehicle, such as an aircraft 120. In an exemplary embodiment, the system 100 includes, without limitation, a display device 102, a user input device 104, an audio output device 105, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, wherein the processing system 106 and the display system 108 are cooperatively configured to display, render, or otherwise convey one or more graphical representations or images associated with operation of the aircraft 120 on the display device 102, as described in greater detail below. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the system 100 in a "hands free" manner without requiring the user to move his or her hands, eyes and/or head to interact with the system 100. The audio output device 105 is coupled to the processing system 106, and the audio output device 105 and the processing system 106 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 106 includes processing logic that may be configured to carry out the functions, techniques, and processing tasks associated with the operation of the system 100 described in greater detail below. Furthermore, the steps of a method or algorithm described in connection with the embodiments disclosed herein may be embodied directly in hardware, in firmware, in a software module executed by the processing system 106, or in any practical combination thereof. In accordance with one or more embodiments, the processing system 106 includes or otherwise accesses a memory or another suitable non-transitory short or long term storage media capable of storing computer-executable programming instructions or other data for execution that, when read and executed by the processing system 106, cause the processing system 106 to execute and perform one or more of the processes tasks, operations, and/or functions described herein. In some embodiments, when the user input device 104 is realized as an audio input device, the processing system 106 may implement a speech recognition engine (or voice recognition engine) and/or speech-to-text system adapted to receive audio input from a user. The processing system 106 may also include various filters, analog-to-digital converters (ADCs), digital-to-analog converters (DACs), speech synthesizers, and the like, which are suitably configured to support operations of the system 100 (e.g., receiving auditory input from the user input device 104 or providing auditory feedback via the audio output device 105).

The display system 108 generally represents the hardware, software, and/or firmware components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

As described in greater detail below, in an exemplary embodiment, the processing system 106 includes or otherwise accesses a data storage element 118 (or database), which maintains information regarding the taxi paths for one or more airports or other ground locations. As used herein, a taxi path should be understood as a delineated path for travel on the ground, such as a taxiway, runway, or another navigational path on the ground. In an exemplary embodiment, each airport is associated with a plurality of taxi paths for traveling between the hangars, terminals, aprons, ramp areas, parking stands, de-icing stands and/or runways at the respective airport. In this regard, the data storage element 118 maintains an association between a respective airport and the taxi paths located at that respective airport. In an exemplary embodiment, the data storage element 118 maintains geographic information pertaining to the taxi paths at the respective airport, such as, for example, the geographic location of the endpoints of the taxiways and/or runways, alphanumeric identifiers for the respective taxiways and/or runways, identification of the taxiways and/or runways that intersect, cross or otherwise connect to another taxiway and/or runway, the geographic location of the intersections of taxiways and/or runways, or other information relating to the relationship between a respective taxiway and/or runway and the other taxiways and/or runways at the airport. The data storage element 118 also maintains one or more attributes associated with each of the taxi paths, such as, for example, the type of taxi path (e.g., runway or taxiway), the width of the taxi path, the weight limit for the taxi path (e.g., the maximum allowable weight for taxiing aircraft on the taxi path), the type of surface of the taxi path (e.g., concrete, asphalt, or the like), and the like. Additionally, as described in greater detail below, in accordance with one or more embodiments, the data storage element 118 also maintains status information for the taxi paths (or portions thereof) at the airport indicating whether or not a respective taxi path (or portion thereof) is currently operational along with directional information for the taxi paths (or portions thereof).

Depending on the embodiment, the data storage element 118 may be physically realized using RAM memory, ROM memory, flash memory, registers, a hard disk, or another suitable data storage medium known in the art or any suitable combination thereof. In an exemplary embodiment, the processing system 106, the display system 108, and/or the FMS 114 are cooperatively configured to render and/or display, on the display device 102, a navigational map of an airport (alternatively referred to herein as an airport map) that includes a graphical representation of the taxi paths at that airport utilizing the taxi path information maintained by the data storage element 118 for that particular airport. In an exemplary embodiment, the processing system 106 is configured to display or otherwise graphically indicate, on the airport map displayed on the display device 102, a taxi clearance for the aircraft 120 based on an input taxi clearance received by the processing system 106 (e.g., via user input device 104). As described in greater detail below in the context of FIGS. 2-3, the processing system 106 automatically completes any discontinuities or corrects any improper taxi paths in the input taxi clearance by determining optimal taxi route(s) between successive non-intersecting taxi paths of the input taxi clearance and graphically indicates the optimal taxi route(s) as part of the taxi clearance for the aircraft 120.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. In an exemplary embodiment, the avionics system 116 includes an automated system adapted to provide auditory guidance and/or warnings to a user via audio output device 105 when taxiing, as described in greater detail below. It should be noted that although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). In this regard, in some embodiments, the display device 102, the user input device 104, the audio output device 105, and/or the processing system 106 may be implemented as an electronic flight bag that is separate from the aircraft 120 but capable of being communicatively coupled to the other elements of the system 100 when onboard the aircraft 120. Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the display system 108 or the FMS 114. In other words, some embodiments may integrate the processing system 106 with the display system 108 or the FMS 114, that is, the processing system 106 may be a component of the display system 108 and/or the FMS 114.

Figure 2:
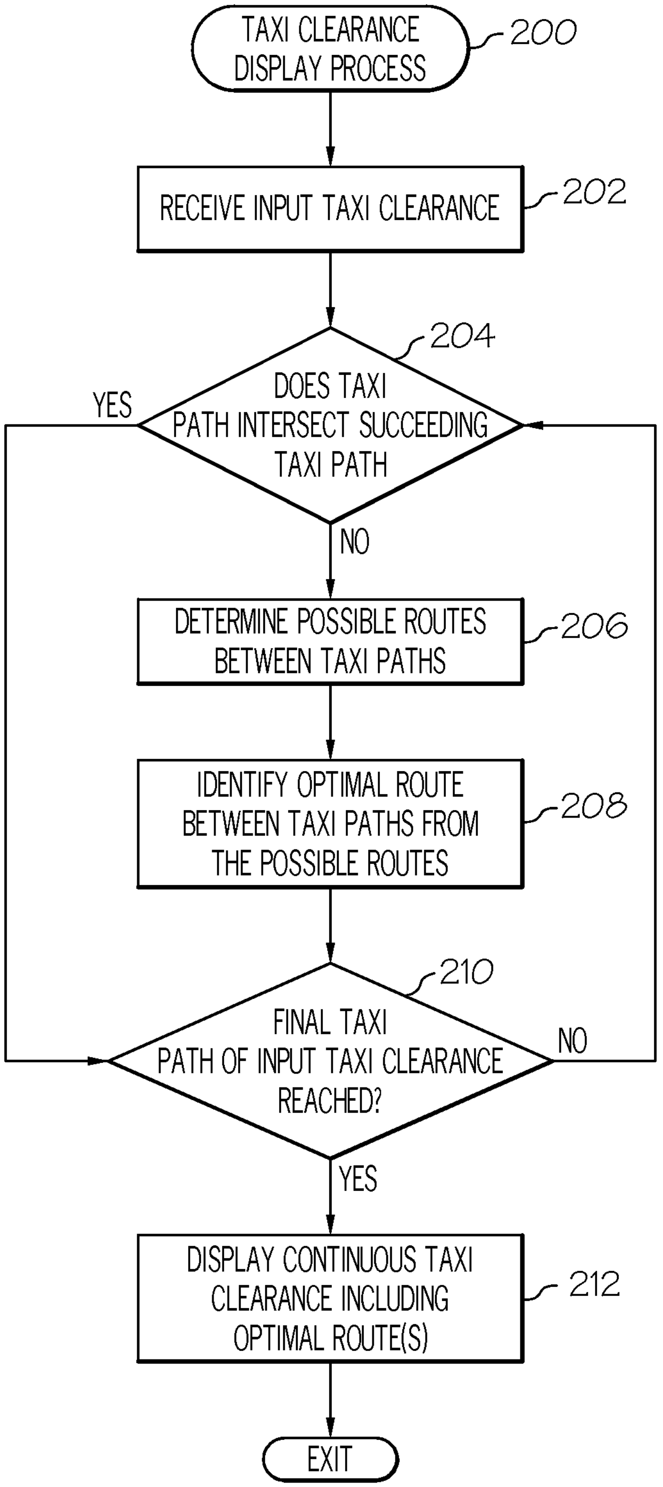
FIG. 2 is a flow diagram of an exemplary taxi clearance display process suitable for use with the system of FIG. 1 in accordance with one or more embodiments.

Referring now to FIG. 2, in an exemplary embodiment, the system 100 is configured to perform a taxi clearance display process 200 and additional tasks, functions, and operations described below. The various tasks performed in connection with the illustrated process 200 may be performed by software, hardware, firmware, or any combination thereof. For illustrative purposes, the following description may refer to elements mentioned above in connection with FIG. 1. In practice, portions of the taxi clearance display process 200 may be performed by different elements of the system 100, such as, the display device 102, the user input device 104, the audio output device 105, the processing system 106, the display system 108, the communications system 110, the navigation system 112, the FMS 114, and/or the avionics system 116. It should be appreciated that the taxi clearance display process 200 may include any number of additional or alternative tasks, the tasks need not be performed in the illustrated order and/or the tasks may be performed concurrently, and/or the taxi clearance display process 200 may be incorporated into a more comprehensive procedure or process having additional functionality not described in detail herein. Moreover, one or more of the tasks shown and described in the context of FIG. 2 could be omitted from a practical embodiment of the taxi clearance display process 200 as long as the intended overall functionality remains intact.

Still referring to FIG. 2, and with continued reference to FIG. 1, in an exemplary embodiment, the taxi clearance display process 200 begins by receiving or otherwise obtaining an input taxi clearance for the aircraft at the particular airport of interest (e.g., the airport the aircraft is currently located at or is currently approaching) (task 202). In this regard, the input taxi clearance (or taxi instructions) is a sequence of taxi paths that define the taxi route that the aircraft should follow when traversing between an initial location on the ground and a destination location on the ground (e.g., between terminals, hangars and/or runways) to avoid confusion and/or runway incursions or to otherwise maintain safe and organized ground traffic flow. For example, a user (e.g., a pilot, co-pilot or another crew member) may utilize the user input device 104 to relay a sequence of taxi paths provided by an air traffic controller and thereby input or otherwise provide the input taxi clearance to the processing system 106. In this regard, when the user input device 104 is an audio input device, the pilot may audibly repeat the taxi clearance provided by the air traffic controller, wherein the processing system 106 performs one or more speech recognition techniques and/or algorithms to recognize, verify, or otherwise determine the taxi paths of the input taxi clearance. In alternative embodiments, the processing system 106 may recognize the sequence of taxi paths as they are provided by the air traffic controller, or the processing system 106 may receive the input taxi clearance in response to a user manipulating the user input device 104 (e.g., a knob or cursor control device) to input, select, or otherwise indicate the taxi paths of the input taxi clearance. In an exemplary embodiment, for each taxi path provided to the processing system 106, the processing system 106 accesses the data storage element 118 to ensure that the received taxi path is valid and currently operational based on the status information for that taxi path. In this regard, the processing system 106 may disregard or otherwise exclude from the input taxi clearance any taxi paths that are unavailable (e.g., taxiways that are not operational due to temporary construction or other restrictions) or otherwise do not exist at the airport. In some embodiments, the processing system 106 may provide a notification to the air traffic controller (e.g., via a data link system or communications system 110) indicating that there is a problem with the input taxi clearance that has been provided when the processing system 106 detects unavailable or non-existent taxi paths.

In an exemplary embodiment, the taxi clearance display process 200 continues by analyzing the received input taxi clearance and determining whether each taxi path of the input taxi clearance intersects the succeeding taxi path of the input taxi clearance (task 204). In response to determining that a taxi path of the input taxi clearance intersects the succeeding taxi path of the input taxi clearance, the taxi clearance display process 200 determines whether the final taxi path of the input clearance has been reached (task 210), and if the final taxi path has not been reached, the taxi clearance display process 200 continues by determining whether that previously succeeding taxi path intersects the next succeeding taxi path of the input taxi clearance (task 204). For example, the processing system 106 may begin by analyzing the first (or initial) taxi path of the input taxi clearance and determining whether the first taxi path intersects the second taxi path of the input taxi clearance. When the first taxi path intersects the second taxi path of the input taxi clearance, the processing system 106 continues by determining whether the second taxi path is the final taxi path of the input taxi clearance, and when the second taxi path is not the final taxi path of the input taxi clearance, the processing system 106 determines whether the second taxi path intersects the third taxi path of the input taxi clearance, and so on.

In response to determining that a taxi path of the input taxi clearance currently being analyzed does not intersect the succeeding taxi path of the input taxi clearance, the taxi clearance display process 200 determines that a discontinuity in the input taxi clearance exists and determines or otherwise identifies a plurality of possible taxi routes between the taxi path being analyzed and the succeeding taxi path of the input taxi clearance (task 206). In an exemplary embodiment, to determine the possible taxi paths, the processing system 106 accesses the taxi path information for the airport maintained by the data storage element 118 and constructs an oriented (or directional) graph data structure that is representative of the taxi paths at the airport. In this regard, each geographic location where two or more taxi paths intersect corresponds to a node of the oriented graph, while the portions (or segments) of the taxi paths between two different intersection locations (or nodes) become an edge of the oriented graph. Each node of the oriented graph is associated with the alphanumeric identifiers of the taxi paths that intersect at that location, and each edge of the oriented graph is associated with the alphanumeric identifier of its corresponding taxi path. Additionally, each edge of the oriented graph is associated with the length (or geographic distance) of that particular portion of its associated taxi path along with any directional limitations associated with that particular portion of its associated taxi path (e.g., in the case of one-way taxi paths). In an exemplary embodiment, each edge of the oriented graph is also associated with the type of taxi path (e.g., taxiway, runway, or the like) it corresponds to for weighting the length of the edges, as described in greater detail below in the context of FIG. 3. In accordance with one or more embodiments, the processing system 106 excludes, from the oriented graph, any edges corresponding to portions of taxi paths that are currently not operational (e.g., taxiways temporarily closed due to construction and the like) based on the status information for those taxi paths maintained by the data storage element 118.

After constructing the oriented graph, the processing system 106 determines one or more starting nodes of the oriented graph based on the taxi path being analyzed. In this regard, each starting node represents a location along the taxi path currently being analyzed where the aircraft may exit the taxi path. In an exemplary embodiment, the processing system 106 obtains the current location and/or heading of the aircraft, and when the current location of the aircraft is on the taxi path being analyzed, the processing system 106 identifies the starting node of the oriented graph as the node associated with the taxi path being analyzed that corresponds to the intersection location in the direction of the current aircraft heading from the current aircraft location that is nearest to the current location of the aircraft. When the current location of the aircraft is not on the taxi path being analyzed, the processing system 106 determines an anticipated (or expected) intersection location on the taxi path being analyzed where the aircraft will enter the taxi path, and selects the remaining intersection locations associated with the taxi path being analyzed as possible starting nodes. Excluding the node corresponding to the intersection location where the aircraft will enter the taxi path ensures that at least a portion of the taxi path being analyzed is utilized by the aircraft when traversing to the succeeding taxi path of the input taxi clearance, as described in greater detail below. It should be noted that in the case of runway crossings, the aircraft will enter and exit runway at the same node, which corresponds to the intersection of the runway with the preceding taxi path of the taxi clearance, in which case, the node corresponding to the intersection location where the aircraft will enter (or cross) the runway is not excluded from being a starting node because it is the node where the aircraft exits (or finishes crossing) the runway.

In an exemplary embodiment, the processing system 106 also determines one or more destination nodes of the oriented graph based on the succeeding taxi path of the input taxi clearance. In this regard, the processing system 106 identifies each of the nodes of the oriented graph that are associated with the succeeding taxi path as possible destination nodes and excludes, from the possible destination nodes, the node (s) corresponding to the intersection of the succeeding taxi path and the next succeeding taxi path. Excluding the node corresponding to the intersection of the succeeding taxi path and the next succeeding taxi path ensures that at least a portion of the succeeding taxi path is utilized by the aircraft when traversing from the succeeding taxi path to the next succeeding taxi path of the input taxi clearance.

After determining starting node(s) and destination node(s), the processing system 106 determines the different possible taxi routes between the two successive non-intersecting taxi paths of the input taxi clearance utilizing the oriented graph data structure. In this regard, each unique combination of nodes and edges of the oriented graph that provide a route between a starting node and a destination node may be identified by the processing system 106 as a possible taxi route. By virtue of the graph being oriented or directional, the taxi clearance display process 200 accounts for any unidirectional (or one-way) taxi paths when determining possible routes between the starting node and destination node(s) such that none of the possible taxi routes requires traversing a unidirectional taxi path in the direction opposite its designated direction.

After determining the plurality of possible taxi routes between successive non-intersecting taxi paths of the input taxi clearance, the taxi clearance display process 200 continues by identifying or otherwise determining the optimal taxi route between successive taxi paths from the plurality of possible taxi routes based on one or more different criteria (task 208), as described in greater detail below in the context of FIG. 3. In this regard, the processing system 106 automatically filters or otherwise eliminates one or more of the possible taxi routes from consideration until arriving at a single taxi route, which represents the optimal taxi route based on the criteria used to filter the possible taxi routes. After determining the optimal taxi route to the succeeding taxi path of the two successive non-intersecting taxi paths of the input taxi clearance, the taxi clearance display process 200 continues by determining whether the succeeding taxi path is the final taxi path of the input taxi clearance, and if not, repeating the loop defined by tasks 204, 206, 208 and 210 until reaching the final taxi path of the input taxi clearance. Once the final taxi path of the input taxi clearance is reached, the taxi clearance display process 200 continues by displaying the continuous completed taxi clearance that includes the identified optimal route (s) between successive non-intersecting taxi paths of the received input taxi clearance (task 212). In this regard, the displayed taxi clearance is obtained by inserting the optimal taxi route(s) into the input taxi clearance between successive non-intersecting taxi paths of the input taxi clearance. In this manner, the optimal taxi route(s) are graphically indicated on the display device 102 and may be utilized by the aircraft 120 when taxiing at the airport.

Figure 3:
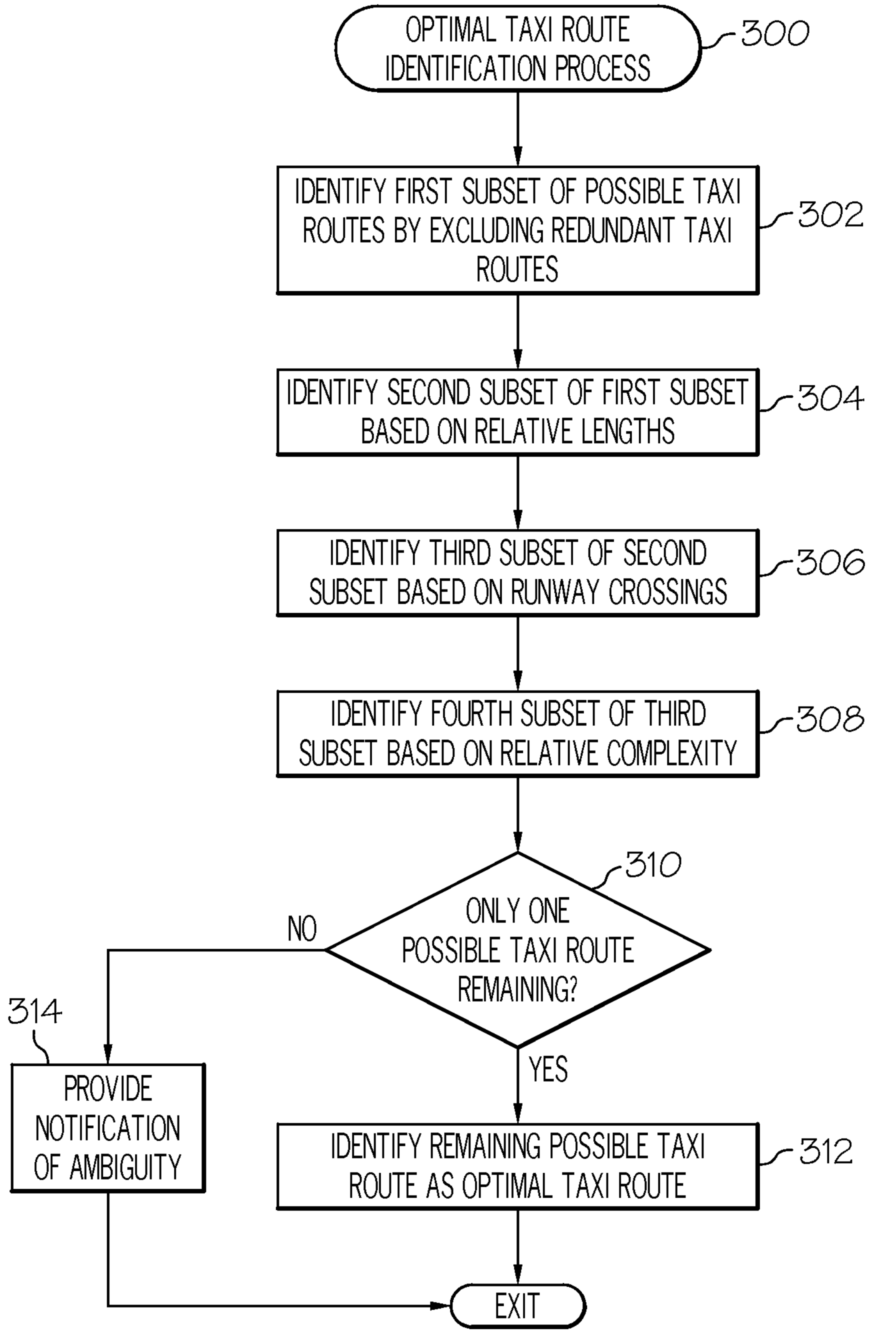
FIG. 3 is a flow diagram of an exemplary optimal taxi route identification process suitable for use with the taxi clearance display process of FIG. 2 in accordance with one or more embodiments.

Referring now to FIG. 3, in an exemplary embodiment, the system 100 is configured to perform an optimal taxi route identification process 300 to select or otherwise identify an optimal taxi route from a plurality of possible taxi routes between two successive non-intersecting taxi paths. The various tasks performed in connection with the illustrated process 300 may be performed by software, hardware, firmware, or any combination thereof. For illustrative purposes, the following description may refer to elements mentioned above in connection with FIG. 1. In practice, portions of the optimal taxi route identification process 300 may be performed by different elements of the system 100, such as, the processing system 106, the display system 108, the FMS 114, and/or the avionics system 116. It should be appreciated that the optimal taxi route identification process 300 may include any number of additional or alternative tasks, the tasks need not be performed in the illustrated order and/or the tasks may be performed concurrently, and/or the optimal taxi route identification process 300 may be incorporated into a more comprehensive procedure or process having additional functionality not described in detail herein. Moreover, one or more of the tasks shown and described in the context of FIG. 3 could be omitted from a practical embodiment of the optimal taxi route identification process 300 as long as the intended overall functionality remains intact.

In an exemplary embodiment, the optimal taxi route identification process 300 is integrated with the taxi clearance display process 200 (e.g., task 208) to determine the optimal taxi route between two successive non-intersecting taxi routes of an input taxi clearance. The illustrated embodiment of the optimal taxi route identification process 300 begins by identifying or otherwise selecting a first subset of the plurality of possible taxi routes by excluding, eliminating, or otherwise removing any redundant taxi routes from the possible taxi routes (task 302). In this regard, a redundant taxi route is any taxi route that includes loops, traverses the same portion of a taxi path more than once, or otherwise indicates a redundancy in the taxi clearance. The processing system 106 excludes any redundant taxi routes from the possible taxi paths to obtain a first subset of possible taxi routes.

After excluding taxi routes including loops, the optimal taxi route identification process 300 continues by identifying or otherwise selecting a second subset of one or more possible taxi routes from the first subset based on their relative lengths (or distances)(task 304). In this regard, the optimal taxi route identification process 300 may exclude, eliminate, or otherwise remove, from the first subset, one or more of the possible taxi routes based on their lengths (or distances) relative to the possible taxi routes selected for the second subset. In an exemplary embodiment, the second subset consists of the possible taxi route(s) of the first subset having the shortest lengths. For each possible taxi route of the first subset, the processing system 106 determines a total length (or distance) of the respective taxi route by adding the individual lengths (or distances) of the taxi paths that make up that respective taxi route. In this regard, the total length of a taxi route is the sum of the lengths of the edges of the oriented graph that define the taxi route.

In accordance with one or more embodiments, the lengths of the edges of the possible taxi routes are weighted based on one or more of their associated attributes (e.g., the type of taxi path, the width of the taxi path, and the like), such that the total length of a taxi route may not be directly proportional to the geographic length (or distance) covered by the taxi route. For example, the edges may be weighted based on whether they correspond to a taxiway or a runway, with the length of edges corresponding to runways being multiplied by a first weighting factor that is greater than a second weighting factor used for taxiways such that taxi routes that primarily consist of taxiways are selected more frequently while taxi routes that include runways are selected less frequently. In this regard, the length of an edge corresponding to a runway is multiplied by the first weighting factor to provide a weighted length for that taxi path that is greater than what the weighted length would be if the edge corresponded to a taxiway. In other embodiments, the lengths of the edges of the oriented graph may be weighted based on other attributes (e.g., the width of the taxi path, the maximum allowable weight limit for the taxi path, the type of surface for the taxi path, and the like), or more complex weighting schemes that weight multiple attributes may be utilized.

In an exemplary embodiment, the processing system 106 identifies the second subset of possible taxi routes by selecting the possible taxi route having the shortest length (e.g., the lowest weighted length) and any of the other possible taxi routes having a length (or weighted length) within a threshold percentage (e.g., within fifty percent or another suitable value) of the shortest length (or lowest weighted length) and excluding any of the taxi routes that do not have a length (or weighted length) within the threshold percentage. For example, assuming the first subset includes four possible taxi routes A, B, C and D, with taxi route A having a weighted length of 10, taxi route B having a weighted length of 11, taxi route C having a weighted length of 13, and taxi route D having a weighted length of 20, then the processing system 106 may select taxi routes A, B and C as the second subset and exclude taxi route D from further consideration based on the weighted length of taxi route D relative to taxi routes A, B and C (e.g., because the weighted length of taxi route D is not within 50% of the weighted length of taxi route A).

In an exemplary embodiment, the optimal taxi route identification process 300 continues by identifying or otherwise selecting a third subset of one or more possible taxi routes from the second subset based on the number of runway crossings (task 306). In this regard, the optimal taxi route identification process 300 may identify the third subset by excluding, eliminating, or otherwise removing one or more possible taxi routes from the second subset based on their number of runway crossings relative to the number of runway crossings for the taxi route(s) of the third subset, such that the third subset consists of the remaining possible taxi route(s) having the fewest runway crossings. In accordance with one or more embodiments, for each remaining possible taxi route of the second subset, the processing system 106 determines a number of runway crossings for that respective taxi route by counting the number of nodes of that respective taxi route in the oriented graph that correspond to or are otherwise associated with a runway intersection. The processing system 106 then obtains the third subset of possible taxi routes by selecting or otherwise identifying the possible taxi route(s) having the fewest runway crossings and excluding any of the taxi routes that have a greater number of runway crossings. For example, continuing the above example, assuming the second subset includes three possible taxi routes A, B, and C, with taxi route A having one runway crossing and taxi routes B and C each having zero runway crossings, the processing system 106 may select taxi routes B and C for inclusion in the third subset and exclude taxi route A from further consideration.

In an exemplary embodiment, the optimal taxi route identification process 300 continues by identifying a fourth subset of one or more possible taxi routes from the third subset based on the relative complexities of the taxi route(s) of the third subset (task 308). In this regard, the optimal taxi route identification process 300 may identify the fourth subset by excluding or otherwise removing one or more possible taxi routes from the third subset based on their complexity relative to the complexity of the remaining taxi route(s) of the fourth subset. In accordance with one embodiment, the optimal taxi route identification process 300 excludes one or more possible taxi routes based on the number of different taxi paths that define that possible taxi route. For example, for each remaining possible taxi route of the third subset, the processing system 106 determines a number of taxi paths for that respective taxi route by counting the number of different taxiways and/or runways associated with the edges of that respective taxi route in the oriented graph data structure. The processing system 106 obtains the fourth subset of possible taxi routes by selecting or otherwise identifying the possible taxi route(s) having the fewest number of taxi paths and excluding any of the taxi routes that have a greater number of taxi paths. For example, continuing the above example, assuming the third subset includes two possible taxi routes B and C, with taxi route B consisting of three different taxi paths and taxi route C consisting of two different taxi paths, the processing system 106 may select taxi route C as the fourth subset and exclude taxi route B from further consideration.

In the illustrated embodiment, the optimal taxi route identification process 300 continues by determining whether more than one possible taxi route remains in the fourth subset (task 310). If only a single taxi route remains (e.g., the fourth subset includes only one taxi route), the optimal taxi route identification process 300 identifies the remaining taxi route as the optimal taxi route (task 312). In this regard, it should be noted that although task 310 is depicted as following task 308 in the illustrated embodiment of the optimal taxi route identification process 300, in practical embodiments, task 310 may follow each of the preceding tasks 302, 304, or 306 before proceeding to the respective following task (e.g., task 304, 306, or 308). As described above, in an exemplary embodiment, the processing system 106 inserts the identified optimal taxi route into the input taxi clearance between two successive non-intersecting taxi paths of the input taxi clearance, such that the optimal taxi route identified by the optimal taxi route identification process 300 is included in the completed taxi clearance and graphically indicated on the display device 102 when the completed taxi clearance is displayed. For example, continuing the above example, when the fourth subset includes only taxi route C, the optimal taxi route identification process 300 concludes that taxi route C is the optimal taxi route and utilizes taxi route C to complete a discontinuous input taxi clearance by inserting taxi route C into the input taxi clearance between two successive non-intersecting taxi paths. Conversely, in response to determining that more than one possible taxi route remains, the optimal taxi route identification process 300 determines that there is an ambiguity as to how to resolve the discontinuity in the input taxi clearance and provides notification of the ambiguity to the user (task 314). For example, the processing system 106 may provide an auditory alert (or warning) to the user via the audio output device 105 or display a visual alert (or warning) on the display device 102, thereby indicating the pilot, co-pilot, or other crew member that there is a problem with the input taxi clearance that has been provided. In some embodiments, the processing system 106 also provides a notification to the air traffic controller (e.g., via a data link system or communications system 110) indicating that there is a non-resolvable problem with the input taxi clearance that has been provided.

Figure 4:
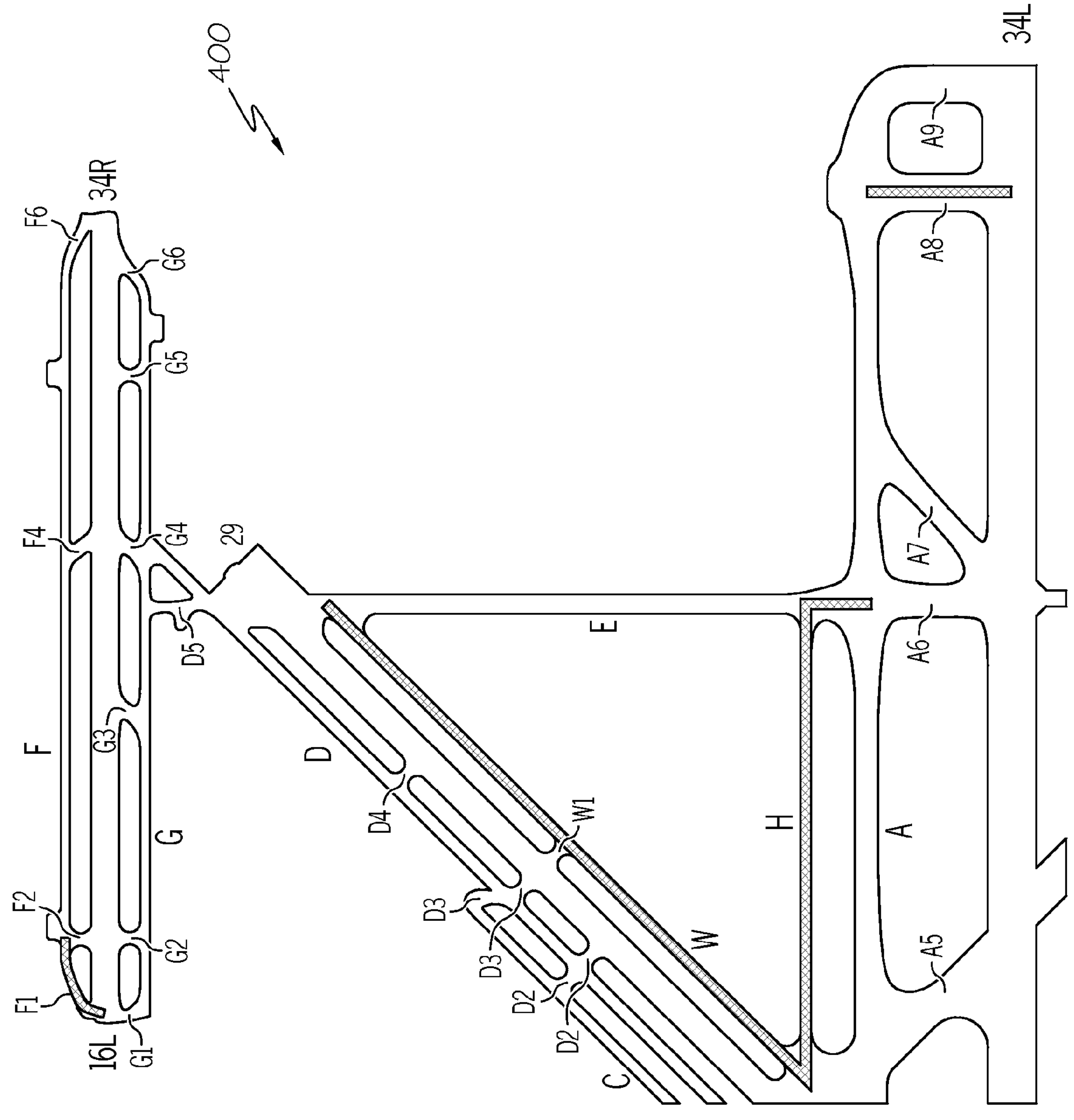
FIG. 4 depicts a graphical representation of a plurality of taxi paths at an airport suitable for use with the exemplary taxi clearance display process of FIG. 2 and the optimal taxi route identification process of FIG. 3 in accordance with one exemplary embodiment.
Figure 5:
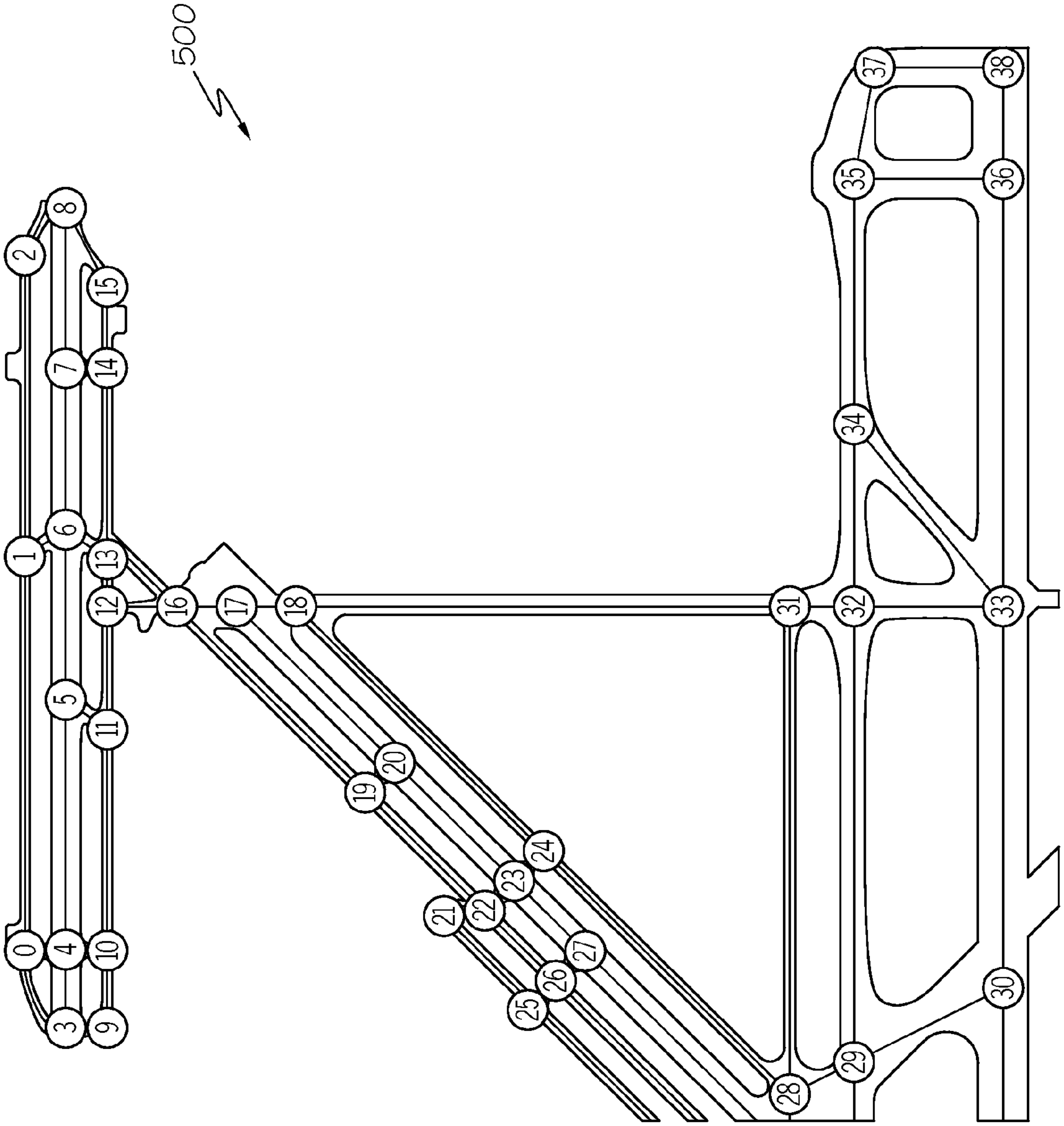
FIG. 5 depicts a graph data structure constructed based on the plurality of taxi paths at the airport of FIG. 4 overlying the graphical representation of the plurality of taxi paths and suitable for use with the exemplary taxi clearance display process of FIG. 2 and the optimal taxi route identification process of FIG. 3 in accordance with one exemplary embodiment.
Figure 6:
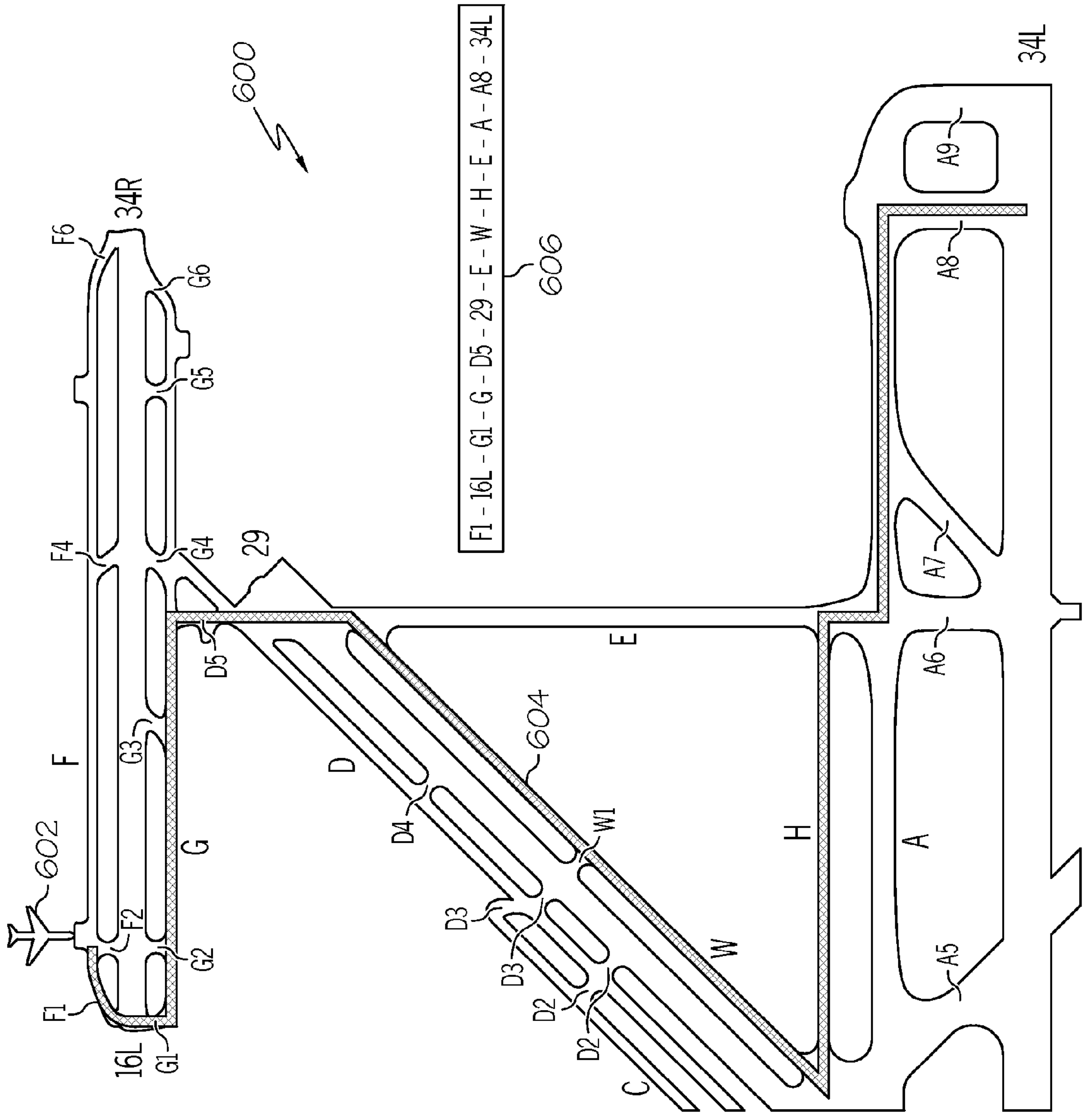
FIG. 6 is a schematic view of an exemplary airport map display suitable for display on the display device in the system of FIG. 1 in accordance with the exemplary taxi clearance display process of FIG. 2 and the optimal taxi route identification process of FIG. 3 for an exemplary input taxi clearance for an aircraft at the airport depicted in FIG. 4 utilizing the graph data structure depicted in FIG. 5.

Referring now to FIGS. 4-6, and with continued reference to FIGS. 1-3, the system 100 of FIG. 1 may perform the taxi clearance display process 200 of FIG. 2 in conjunction with the optimal taxi route identification process 300 of FIG. 3 to complete a taxi clearance for the airport 400 and graphically indicate the completed taxi clearance on an airport map 600 displayed on the display device 102. In this regard, FIG. 4 depicts a graphical representation of an airport 400 that illustrates the layout of a plurality of taxi paths at the airport, and FIG. 5 depicts an oriented graph data structure 500 corresponding to the taxi paths of the airport 400 depicted in FIG. 4 overlying a graphical representation of the taxi paths.

In the illustrated embodiment, the aircraft (e.g., aircraft 120) is located at the airport 400, and a graphical representation 602 of the aircraft is depicted on the airport map 600 at a location corresponding to the current location of the aircraft. For the illustrated example, the pilot and/or co-pilot of the aircraft receives, from the air traffic controller, a taxi clearance from the current location of the aircraft to a location on runway 34L, wherein the pilot and/or co-pilot inputs or otherwise provides the taxi clearance received from the air traffic controller to the processing system 106 via the user input device 104. In the illustrated embodiment, the input taxi clearance received by the processing system 106 includes taxiway F1, taxiway W, taxiway H, taxiway E, taxiway A8, and runway 34L.

As described above in the context of FIG. 2, the processing system 106 analyzes the received input taxi clearance and determines whether each taxi path of the input taxi clearance intersects the succeeding taxi path of the input taxi clearance (e.g., task 204). In response to determining that taxiway F1 does not intersect taxiway W, the processing system 106 continues by determining the possible taxi routes between taxiway F1 and taxiway W and determines the optimal taxi route between taxiway F1 and taxiway W (e.g., tasks 206, 208). As described above, the processing system 106 accesses the taxi path information for the airport 400 maintained by the data storage element 118 and constructs an oriented graph data structure 500 that is representative of the taxi paths at the airport 400. As illustrated in FIG. 5, each location where two or more taxi paths intersect is a node in the oriented graph data structure 500, while the portions of the taxi paths between two intersection locations become edges between nodes of the oriented graph. As described above, each node of the oriented graph is associated with the alphanumeric identifiers of the taxi paths that intersect at that location, and each edge of the oriented graph is associated with the alphanumeric identifier of its corresponding taxi path. For example, node 3 in the oriented graph data structure 500 is associated with taxiway F1, taxiway G1 and runway 16L/34R, node 4 in the oriented graph data structure 500 is associated with taxiway G1 and taxiway G, and the edge between node 3 and node 4 is associated with taxiway G1. Additionally, the edge between node 3 and node 4 is associated with the length of taxiway G1 between its intersection with taxiway F1 and/or runway 16L/34R (e.g., node 3) and its intersection with taxiway G1 (e.g., node 9).

As described above in the context of FIG. 2, after constructing the oriented graph structure 500, the processing system 106 determines a starting node for the possible taxi routes between taxiway F1 and taxiway W based on the layout of taxiway F1 and the location and/or heading of the aircraft. As illustrated in FIG. 5, there are only two nodes along taxiway F1 (node 0 and node 3) which are capable of being a starting node for the possible taxi routes. Based on the current location and/or heading of the aircraft, the processing system 106 determines that, in order for the aircraft to traverse or otherwise utilize taxiway F1, the aircraft must enter taxiway F1 at node 0, and therefore, must exit taxiway F1 at node 3. Accordingly, the processing system 106 identifies node 3 as the starting node for the possible taxi routes between taxiway F1 and taxiway W. The processing system 106 also determines one or more destination nodes on taxiway W by identifying the nodes of the oriented graph data structure 500 associated with taxiway W (node 18, node 24, and node 28) and excluding the node that corresponds to the intersection of taxiway W with taxiway H (node 28) to ensure that at least a portion of taxiway W is traversed to reach taxiway H, resulting in node 18 and node 24 as the possible destination nodes for the possible taxi routes from node 3. As described above, after the starting and destination node(s) are determined, the processing system 106 determines or otherwise identifies the possible taxi routes between taxiway F1 and taxiway W as all of the different possible taxi routes between node 3 and node 18 along with all of the possible taxi routes between node 3 and node 24.

After identifying the possible taxi routes between node 3 on taxiway F1 and taxiway W, the processing system 106 performs the optimal taxi route identification process 300 to identify the optimal taxi route between taxiway F1 and taxiway W. As described above, in an exemplary embodiment, the processing system 106 begins by excluding any redundant taxi routes between node 3 and taxiway W (node 18 or node 24) (e.g., task 302), for example, any taxi routes that traverse node 0 on the way from node 3 to taxiway W. After excluding redundant taxi routes, the processing system 106 determines a total weighted length for each of the remaining possible taxi routes and identifies or otherwise selects a subset of the remaining possible taxi routes between node 3 and taxiway W based on the weighted lengths of the remaining possible taxi routes (e.g., task 304). As described above, in an exemplary embodiment, the length of the edges corresponding to runways (e.g., runway 16L/34R or runway 29) are multiplied by a weighting factor that increases their weighted length relative to taxiways having the same length. In this regard, by virtue of the weighting factor, the processing system 106 may exclude any possible taxi routes that utilize runway 16L/34R or runway 29 to traverse from node 3 to taxiway W. After excluding one or more possible taxi routes based on the weighted length, the processing system 106 continues by excluding one or more possible taxi routes based on the number of runway crossings (e.g., task 306), and if more than one possible taxi route remains, further excluding one or more possible taxi routes based on their relative complexity (e.g., task 308). As illustrated in FIG. 6, after completing the optimal taxi route identification process 300, the processing system 106 identifies taxi route G1-G-D5-E as the optimal taxi route between node 3 on taxiway F1 and node 18 on taxiway W and inserts taxi route 16L-G1-G-D5-29-E (to indicate the crossings of runways 16L and 29) in the completed taxi clearance between taxiway F1 and taxiway W of the input taxi clearance.

After determining the optimal taxi route to reach taxiway W, the processing system 106 continues by determining whether taxiway W intersects the succeeding taxi path of the input taxi clearance (e.g., taxiway H), and so on, until reaching the final taxiway of the input taxi clearance. In response to determining that taxiway E does not intersect taxiway A8, the processing system 106 continues by determining the possible taxi routes between taxiway E and taxiway A8 and determines the optimal taxi route between taxiway E and taxiway A8 in a similar manner as described above. As illustrated in FIG. 6, after completing the optimal taxi route identification process 300, the processing system 106 identifies taxi route A as the optimal taxi route between node 32 on taxiway A and node 35 on taxiway A and inserts taxi route A in the completed taxi clearance between taxiway E and taxiway A8 of the input taxi clearance. After reaching the final taxi path of the input taxi clearance, the processing system 106 graphically indicates or otherwise displays the completed taxi clearance 604 on the airport map 600 displayed on the display device 102. For example, the processing system 106 may display or otherwise render the portions of the taxi paths corresponding to the completed taxi clearance (F1-16L-G1-G-D5-29-E-W-H-E-A-A8-34L) using a visually distinguishable characteristic (e.g., a visually distinguishable color, hue, tint, brightness, graphically depicted texture or pattern, contrast, transparency, opacity, shading, animation, and/or other graphical effects) to highlight those portions of taxi paths as the route that the aircraft 120 is intended to travel. In an exemplary embodiment, the processing system 106 concurrently displays a textual representation 606 of the completed taxi clearance on the airport map 600. Additionally, in one or more embodiments, the processing system 106 may provide the completed taxi clearance to an avionics system 116 configured to provide auditory guidance and/or warnings to the pilot and/or co-pilot via audio output device 105 when taxiing the aircraft 120.

For the sake of brevity, conventional techniques related to graphics and image processing, taxiing, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by processing system 106), facilitate identifying optimal taxi routes and displaying completed taxi clearances on a display device (e.g., display device 102) in accordance with the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method of displaying a taxi clearance for an aircraft, the method comprising:

receiving an input taxi clearance including a first taxi path of a plurality of taxi paths at an airport and a second taxi path of the plurality of taxi paths, the second taxi path succeeding the first taxi path in the input taxi clearance, a discontinuity existing between the first taxi path and the second taxi path;

constructing an oriented graph data structure based on the plurality of taxi paths at the airport;

determining the discontinuity exists in the input taxi clearance between the first taxi path and the second taxi path;

identifying one or more starting nodes of the oriented graph data structure based on the first taxi path, the one or more starting nodes representing one or more locations along the first taxi path where the aircraft may exit the first taxi path by excluding, from the one or more starting nodes, a first node of the oriented graph data structure that corresponds to a location where the aircraft will enter the first taxi path;

identifying one or more destination nodes of the oriented graph data structure based on the second taxi path, the one or more destination nodes being associated with the second taxi path, wherein a second node of the oriented graph data structure that corresponds to an intersection of the second taxi path and a next succeeding taxi path of the input taxi clearance is excluded from the one or more destination nodes;

determining, by a processing system, a plurality of possible taxi routes between the first taxi path and the second taxi path using the oriented graph data structure, wherein each possible taxi route of the plurality of possible taxi routes comprises a route between a starting node of the one or more starting nodes and a destination node of the one or more destination nodes;

identifying an optimal taxi route from among the plurality of possible taxi routes; and graphically indicating, on a display device associated with the aircraft, that the taxi clearance for the aircraft includes the optimal taxi route between the first taxi path and the second taxi path.

2. The method of claim 1, wherein identifying the optimal taxi route comprises identifying a first taxi route of the plurality of possible taxi routes as having a shortest length relative to remaining taxi routes of the plurality of possible taxi routes.

3. The method of claim 1, wherein identifying the optimal taxi route comprises identifying a first taxi route of the plurality of possible taxi routes as having a lowest complexity relative to remaining taxi routes of the plurality of possible taxi routes.

4. The method of claim 1, wherein identifying the optimal taxi route comprises identifying a first taxi route of the plurality of possible taxi routes as having a lowest number of runway crossings relative to remaining taxi routes of the plurality of possible taxi routes.

5. The method of claim 1, wherein identifying the optimal taxi route comprises excluding a first taxi route of the plurality of possible taxi routes based on a length of the first taxi route relative to a length of the optimal taxi route.

6. The method of claim 1, wherein identifying the optimal taxi route comprises excluding a first taxi route of the plurality of possible taxi routes based on a complexity of the first taxi route relative to a complexity of the optimal taxi route.

7. The method of claim 1, wherein identifying the optimal taxi route comprises excluding a first taxi route of the plurality of possible taxi routes based on a number of runway crossings of the first taxi route relative to a number of runway crossings of the optimal taxi route.

8. The method of claim 1, wherein identifying the optimal taxi route comprises:

identifying a first subset of the plurality of possible taxi routes based on lengths of the plurality of possible taxi routes, the first subset including the optimal taxi route;

identifying a second subset of the first subset of possible taxi routes based on a number of runway crossings for the possible taxi routes of the first subset, the second subset including the optimal taxi route;

identifying a third subset of the second subset of possible taxi routes based on relative complexities of the possible taxi routes of the second subset; and identifying an individual taxi route of the plurality of possible taxi routes as the optimal taxi route when the third subset includes only the individual taxi route.

9. The method of claim 8, wherein:

identifying the first subset comprises excluding one or more taxi routes of the plurality of possible taxi routes having a length greater than a length of the optimal taxi route;

identifying the second subset comprises excluding one or more taxi routes of the first subset having a number of runway crossings greater than a number of runway crossings for the optimal taxi route; and identifying the third subset comprises excluding one or more taxi routes of the second subset having a number of taxi paths greater than a number of taxi paths of the optimal taxi route.

10. The method of claim 1, each possible route including one or more edges between one of the one or more starting nodes and one of the one or more destination nodes, wherein identifying the optimal taxi route comprises:

determining, for each possible route, a total length based on weighted lengths of the one or more edges of the respective possible route; and identifying a first subset of the plurality of possible routes, wherein the possible routes of the first subset have lower total lengths relative to remaining possible routes of the plurality of possible routes.

11. The method of claim 10, wherein identifying the optimal taxi route further comprises:

determining, for each possible route of the first subset, a number of runway crossings for the respective possible route; and identifying a second subset of the first subset of possible routes, wherein the possible routes of the second subset have fewer runway crossings relative to remaining possible routes of the first subset.

12. The method of claim 11, wherein identifying the optimal taxi route further comprises:

determining, for each possible route of the second subset, a number of taxi paths for the respective possible route; and identifying a first possible route of the second subset having a lowest number of taxi paths as the optimal taxi route.

13. The method of claim 1, wherein determining the plurality of possible taxi routes comprises excluding any taxi route between a starting node of the one or more starting nodes and a destination node of the one or more destination nodes that indicates a redundancy in the taxi clearance.

14. A method of displaying a taxi clearance for an aircraft on a display device onboard the aircraft, the method comprising:

receiving an input taxi clearance for the aircraft, the input taxi clearance including a first taxi path of a plurality of taxi paths at an airport and a second taxi path of the plurality of taxi paths, wherein the second taxi path succeeds the first taxi path in the input taxi clearance;

determining that the first taxi path and the second taxi path do not intersect;

determining, by a processing system, a plurality of possible taxi routes between the first taxi path and the second taxi path in response to determining that the first taxi path and the second taxi path do not intersect, each possible taxi route including one or more taxi paths of the plurality of taxi paths, wherein determining the plurality of possible taxi routes comprises:

constructing an oriented graph data structure based on the plurality of taxi paths at the airport;

identifying one or more starting nodes of the oriented graph data structure based on the first taxi path, the one or more starting nodes representing one or more locations along the first taxi path where the aircraft may exit the first taxi path;

identifying one or more destination nodes of the oriented graph data structure based on the second taxi path, the one or more destination nodes being associated with the second taxi path, wherein a first node of the oriented graph data structure that corresponds to an intersection of the second taxi path and a next succeeding taxi path of the input taxi clearance is excluded from the one or more destination nodes; and determining the plurality of possible taxi routes using the oriented graph data structure, wherein each possible taxi route of the plurality of possible taxi routes comprises a route between a starting node of the one or more starting nodes and a destination node of the one or more destination nodes;

identifying a first taxi route from among the plurality of possible taxi routes as an optimal taxi route between the first taxi path and the second taxi path; and displaying, on the display device, a graphical representation of the taxi clearance including the optimal taxi route inserted between the first taxi path and the second taxi path.

15. The method of claim 14, wherein identifying the first taxi route comprises selecting, from the plurality of possible taxi routes, a first subset of possible taxi routes based on respective lengths of the possible taxi routes of the first subset relative to respective lengths of remaining possible taxi routes of the plurality of possible taxi routes, wherein the respective lengths of the possible taxi routes of the first subset are less than the respective lengths of the remaining possible taxi routes of the plurality of possible taxi routes.

16. The method of claim 15, wherein identifying the first taxi route further comprises selecting, from the first subset, a second subset of possible taxi routes based on a number of runway crossings of the possible taxi routes of the second subset relative to a respective number of runway crossings of remaining possible taxi routes of the first subset, wherein the number of runway crossings of the possible taxi routes of the second subset are less than the number of runway crossings of the remaining possible taxi routes of the first subset.

17. The method of claim 16, wherein identifying the first taxi route further comprises selecting, from the second subset, the first taxi route based on a complexity of the first taxi route relative to remaining possible taxi routes of the second subset.

18. A system comprising:

a display device;

a data storage element configured to maintain information pertaining to a plurality of taxi paths; and a processing system coupled to the display device and the data storage element, wherein the processing system is configured to:

receive an input taxi clearance including a first taxi path of the plurality of taxi paths and a second taxi path of the plurality of taxi paths, the second taxi path succeeding the first taxi path, a discontinuity existing between the first taxi path and the second taxi path;

construct an oriented graph data structure based on the information maintained by the data storage element;

determine the discontinuity exists in the input taxi clearance between the first taxi path and the second taxi path;

identify one or more starting nodes of the oriented graph data structure based on the first taxi path, the one or more starting nodes representing one or more locations along the first taxi path where an aircraft may exit the first taxi path, wherein a first node of the oriented graph data structure that corresponds to a location where the aircraft will enter the first taxi path is excluded from the one or more starting nodes;

identifying one or more destination nodes of the oriented graph data structure based on the second taxi path, the one or more destination nodes being associated with the second taxi path, wherein a second node of the oriented graph data structure that corresponds to an intersection of the second taxi path and a next succeeding taxi path of the input taxi clearance is excluded from the one or more destination nodes;

determine a plurality of possible taxi routes between the first taxi path and the second taxi path using the oriented graph data structure, wherein each possible taxi route of the plurality of possible taxi routes comprises a route between a starting node of the one or more starting nodes and a destination node of the one or more destination nodes;

identify an optimal taxi route from among the plurality of possible taxi routes based on the information maintained by the data storage element; and graphically indicate the optimal taxi route on the display device.

19. The system of claim 18, wherein:

the display device is onboard the aircraft;

the display device has a map of an airport having the plurality of taxi paths displayed thereon; and the processing system is configured to graphically indicate the optimal taxi route by displaying a graphical representation of a taxi clearance including the optimal taxi route between the first taxi path and the second taxi path overlying the map.

* * * * *